United States Patent [19]

Carr et al.

[11] 4,146,680

[45] Mar. 27, 1979

[54] OPERATIONAL ZINC CHLORINE BATTERY BASED ON A WATER STORE

[75] Inventors: Peter Carr, Utica; Philip C. Symons, Birmingham; David J. Aller, Royal Oak, all of Mich.

[73] Assignee: Energy Development Associates, New York, N.Y.

[21] Appl. No.: 915,613

[22] Filed: Jun. 15, 1978

[51] Int. Cl.² .......................................... H01M 10/00
[52] U.S. Cl. ...................................... 429/51; 429/70; 429/101; 429/199
[58] Field of Search .................... 429/19, 51, 67, 70, 429/72, 101, 120, 199, 14, 17, 26

[56] References Cited

U.S. PATENT DOCUMENTS

| | | |
|---|---|---|
| 3,713,888 | 1/1973 | Symons .............................. 429/70 X |
| 4,001,036 | 1/1977 | Berman et al. .................... 429/70 X |
| 4,072,540 | 2/1978 | Symons et al. ........................ 429/70 |

*Primary Examiner*—Anthony Skapars
*Attorney, Agent, or Firm*—Ostrolenk, Faber, Gerb & Soffen

[57] ABSTRACT

A zinc-chlorine battery system in which chlorine gas evolved from the cell structure of the battery during charging of the battery is combined with a stored supply of water to form solid chlorine hydrate. During the discharge cycle of the battery, the chlorine hydrate is decomposed to replenish the chlorine content of the electrolyte.

11 Claims, 1 Drawing Figure

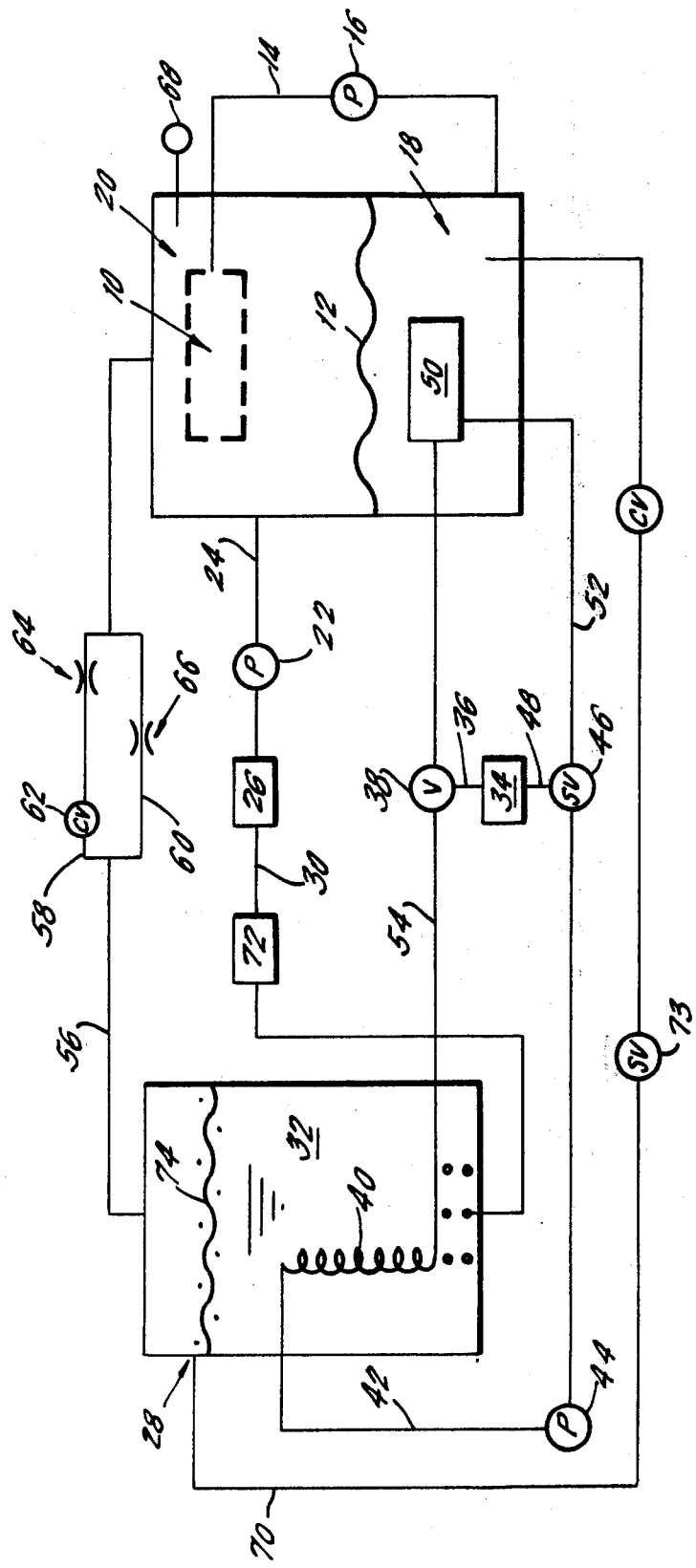

OPERATIONAL ZINC CHLORINE BATTERY BASED ON A WATER STORE

BACKGROUND OF THE INVENTION

1. Field of the Invention

The present invention relates to an electrical energy storage system, and more particularly, a high energy, secondary zinc-chlorine battery.

2. Description of the Prior Art

Electrical energy storage systems or secondary batteries of the type described herein are categorized as being of the so-called high energy density (H.E.D.) type since they are capable of supplying upwards of 50 watt hours of electric power per pound of weight. The high energy capacity and compactness of such (H.E.D.) batteries renders them particularly satisfactory for use as principal or auxiliary sources of electrical energy in both mobile and stationary power plant systems. A metal/halogen/hydrate secondary storage battery of the foregoing type is described in detail in U.S. Pat. No. 3,713,888, issued Jan. 30, 1973 entitled "Process for Electrical Energy Using Solid Halogen Hydrate," which is owned by the same assignee as the present invention. The specific teachings of the aforementioned United States patent application are incorporated herein by reference.

Among the advantages of secondary storage batteries of the metal/halogen/hydrate type is the ability of such systems to be refueled or recharged quickly and efficiently whereby they are again restored to full-charged capacity. In a refuelable storage battery as disclosed in the aforementioned patent, the halogen constituent is replenished by withdrawing a proportion of the aqueous electrolyte and substituting therefor a halogen hydrate which, upon decomposition during normal discharge, liberates elemental halogen and water, whereby the concentration of the metal halide in the electrolyte remains substantially constant during the discharge cycle. The halogen hydrate comprises a compact and extremely convenient method of storing and replenishing the halogen component in the storage system. In a rechargeable storage battery system, a reverse electrical current is applied to the electrode area, whereby the halide is oxidized to the elemental halogen which is recovered as a gas and is reconverted in the presence of water in the corresponding halogen hydrate storage area within the system. In either event, the formation of the halogen hydrate is accomplished under controlled temperature conditions, whereby halogen and water are combined to produce a corresponding solid hydrate. This operation can be performed within the system itself or by a central hydrate processing unit disposed remote from the electrical energy storage system.

During the charging of high energy density secondary batteries utilizing chlorine as the halogen constituent and a highly electropositive metal such as zinc as the electrodes and reactants, an aqueous zinc-chloride electrolyte is circulated through the battery cells, plating out the zinc on an electrode base and generating chlorine at the other electrode. The aqueous zinc-chloride electrolyte passing through the cells carries the chlorine produced during the charging operation out of the electrode area and into the chlorine storage system. In a preferred method of holding chlorine ready for use on discharge, the chlorine is converted to chlorine hydrate, as described in U.S. Pat. No. 3,713,888. During the formation of chlorine hydrate by the methods described therein, chlorine and water moisture are brought together at a cold site, under which conditions, at the appropriate temperature and pressure, chlorine hydrate ($Cl_2 \cdot 6H_2O$) is formed as a solid. The chlorine hydrate may be removed and held under suitable temperature and pressure conditions to maintain it in the solid state, and it may be fed back into the electrolyte stream being returned to the battery in which stream it can release elemental chlorine, preferably as a dissolved or entrained gas, ready for use as a reactant in the battery during electrical discharge.

The present invention is directed to an improved apparatus and method for producing the chlorine hydrate, which is necessary to replenish the chlorine constituent of the electrolyte on discharge of the battery.

SUMMARY OF THE INVENTION

Whereas in the prior art chlorine hydrate was formed by circulating the chlorine-rich electrolyte during charge to a hydrate forming zone by a single pump and cooling the zone to cause chlorine to combine with water obtained from the electrolyte, wherein it was recovered as a solid, the present invention contains a water store to which chlorine only, coming out of the electrolyte solution during charge, is pumped. This gas is combined with the stored water to form the chlorine hydrate, which is decomposed during discharge of the battery to replenish the chlorine content in the electrolyte. The electrolyte is merely recirculated from a pump through the electrode stack and chlorine is added on demand during discharge. The gas pump can be used to maximize charge coulombic efficiency by reducing the chlorine concentration in solution thus minimizing the direct reaction of chlorine on the plated zinc.

DESCRIPTION OF THE INVENTION

Referring now to the drawing which shows one embodiment of the invention, a battery stack 10 contains a plurality of cells, each of which may be formed by a pair of bipolar electrodes (not shown) and has an aqueous zinc-chloride electrolyte 12 fed to it through line 14 by the pressure of a pump 16. Electrical connections to the electrodes, not shown, are utilized to charge the secondary battery illustrated, during which charging electrolyte 12 is flowed through the battery cells. Chlorine gas is generated at the chlorine electrodes, mixes with the flowing electrolyte and returns with the electrolyte to a sump 18 from which the electrolyte is recirculated to stack 10 by pump 16.

The electrolyte returning to reservoir or sump 18 is lower in zinc-chloride content than the original electrolyte entering stack 10 because of the plating out of zinc and the generation of chlorine. The chlorine separates to a significant extent from the electrolyte in a zone 20 above sump 18 during the charging process. However, the dissolved chlorine in the electrolyte circulating through stack 10 reacts to some extent with the plated out zinc at the anode, returning some zinc to solution in the electrolyte and thereby decreasing coulombic efficiency during charging of the battery. The electrolyte can be returned to sump 18 from stack 10 by gravity or through suitable conduits.

The decreased coulombic efficiency is minimized by drawing off chlorine gas by means of a gas pump 22, which has a conduit 24 in communication with zone 20. Pump 22 is designed to maintain a suitable pressure on sump 18, for example, 0.5 atmosphere absolute, while pump 16 operates at a higher pressure, typically 1 or 2 atmospheres, resulting in partial desorbtion of entrained chlorine gas in the electrolyte sump 18, pursuant to Henry's law. The dissolved gas comes out of solution, enters zone 20, and passes into conduit 24 under the action of pump 22. In this particular embodiment, a sump 26 for gas/liquid separation is provided in conduit 24 downstream of pump 22. The pressure in sump 26 is maintained at a level sufficient to drive chlorine out of sump 26 into a store 28 through a conduit 30, the pressure level may vary from less than 1 to more than 2 atmospheres.

The desorbed chlorine gas enters store 28 which contains a supply of stored water 32 in a suitable container. Store 28 is maintained under controlled conditions of temperature and pressure to cause formation of chlorine hydrate from the reaction of chlorine gas entering zone 28 through line 30 and the stored water 32 already in store 28. A filter screen 74 is provided at the surface of water 32.

The temperature in store 28 is controlled through a system which includes a refrigerant or other cooling means 34 from which a coolant or refrigerant is caused to flow through to conduit 36 to a valve means 38 and then to a coil 40 within store 28. When the temperature in the water 32 is sufficiently low, chlorine hydrate forms in store 28. The coolant flows from coil 40 through a conduit 42, driven by a pump 44 and then through a solenoid valve 46 which communicates with refrigerant means 34 through a conduit 48. Solenoid 46 also communicates with a heat exchanger 50 located is sump 18 through a conduit 52. Heat exchanger 50 is also connected to valve means 38 through a conduit 54. The gas space above the level of stored water 32 in store 28 communicates with zone 20 through a conduit 56. Along its length, conduit 56 splits into two lines 58 and 60. Line 58 is provided with a check valve 62 and a low pressure orifice 64. Line 60 is provided with a high pressure orifice 66.

When the battery system is discharged, chlorine is supplied on demand to battery stack 10 where it is reduced to chloride at the cathode, which combined with zinc oxidation at the anode, produces electrical energy and returns zinc chloride to the electrolyte. In order to accomplish this objective, the pressure of the chlorine gas above sump 18 at stack 10 in zone 20 is sensed by a suitable pressure transducer 68 which controls solenoid valve 46. When zone 20 is deficient in chlorine gas, solenoid 46 causes the coolant in coil 40 to be pumped by pump 44 through conduit 52 to heat exchanger 50 which is in heat exchange relationship with the electrolyte 12 in sump 18. As a result, the temperature of the coolant is significantly increased. The warmed liquid is returned to coil 40 through conduit 54 and valve means 38, and the heat is dissipated to the previously formed and stored chlorine hydrate in store 28 to decompose a portion thereof. The liberated chlorine is then conveyed from store 28 to the sump 18 or directly to stack 10 by conduit 70 through open solenoid valve 73. On charge, line 70 is closed at solenoid valve 73. Line 56 serves as a recirculation means for excess chlorine in zone 20. The excess chlorine flows through conduit 56, low pressure orifice 64 and check valve 62 into store 28.

Pump 44 is modulated according to the free chlorine available to the stack 10 and is controlled by stack pressure. Any hydrogen gas formed in the system during electrolysis can be recombined with the chlorine gas by use of a suitable reactor such as hot wire reactor 72 in line 30.

When the battery system is charged, the generated chlorine is conveyed from stack 10 through conduit 24, pump 22, sump 26, conduit 30, into store 28 where it mixes with the water 32 therein. Solenoid 46 and valve 38 isolate heat exchanger 50 from the cooling system such that the coolant is circulated from coil 40 through chiller 34. Any hydrogen gas formed in the system is again recombined with chlorine gas in hot wire reactor 72. Conduit 56 again acts as a recirculation means for any excess chlorine; the excess chlorine in store 28 travels through conduit 56, is prevented from traversing conduit 58 by check valve 62 and therefore travels through conduit 60, and high pressure orifice 66 to gas space 20. This excess chlorine is then returned to the hydrate formation zone in the store through line 24 and pump 22.

Various changes and modifications can be made in this invention without departing from the spirit and scope thereof. The embodiments set forth herein were for the purpose of illustration only and were not intended to limit the invention.

What is claimed is:

1. In an electrical energy storage system, the combination of
    at least one cell having a normally positive electrode for reducing a halogen disposed in electrical contact therewith and a normally negative electrode for oxidizing an oxidizable metal disposed in electrical contact therewith during discharge of said cell,
    means for circulating electrolyte through said cell,
    storage means containing a quantity of water and adapted to store a quantity of halogen hydrate,
    means to recover electrolyte free halogen gas produced during charging of said system and convey said electrolyte free halogen gas to said storage means,
    means to control the temperature of said water in said storage means, and
    means to convey halogen gas from said storage means to said cell.

2. A system in accordance with claim 1 wherein said temperature control means comprises heat exchange means in heat exchange contact with said water, refrigeration means, and means connecting said heat exchange means and said refrigeration means so as to circulate cold heat exchange medium through said heat exchange means.

3. The system of claim 2 further comprising a reservoir for aqueous metal halide electrolyte connected to said cell by said means for circulating electrolyte, a second heat exchange means within said reservoir, and means to connect said first and second heat exchange means and by-pass said refrigeration means upon discharge of said system.

4. A system in accordance with claim 3 wherein said means of recovering the elemental halogen during charging of said cell includes a gas pump and gas separator.

5. A system in accordance with claim 3 including means responsive to the amount of halogen gas present in said cell during discharge of said cell for connecting said heat exchange means in said electrolyte reservoir to said cooling means.

6. A system in accordance with claim 1 including means between said hydrate forming and storing means and said cell for circulating excess halogen gas.

7. A system in accordance with claim 6 wherein said halogen gas circulation means includes a hydrogen reactor for combining any hydrogen gas liberated from said electrolyte with said halogen gas.

8. A method of producing halogen hydrate in a battery during the charging of the battery whereby halogen is formed, said battery having (a) a compartment means with a stack of cells therein; (b) an electrolyte circulating within said stack of cells; (c) a halogen hydrate forming vessel means; and (d) cooling means; said method comprising the steps of:

provides passing said formed halogen from the compartment means into the hydrate forming vessel means, providing a quantity of stored water in said hydrate forming vessel means, cooling the interior of the hydrate forming vessel means by passing coolant therethrough, and reacting said halogen and water to form halogen hydrate.

9. The method of claim 8 including the further step of:

decomposing said halogen hydrate upon discharge of said battery by, raising the temperature of the coolant passing through the hydrate forming vessel, and replenishing said electrolyte with the products of decomposition of said halogen hydrate.

10. The method of claim 9 wherein the temperature of said coolant is raised by, disposing said coolant in heat exchange relation with said electrolyte.

11. The method of claim 10 wherein the temperature of said coolant is raised only when said electrolyte within said stack of cells is depleted of halogen below a predetermined limit.

* * * * *